United States Patent
Chen et al.

(10) Patent No.: US 10,446,915 B2
(45) Date of Patent: Oct. 15, 2019

(54) MOBILE DEVICE

(71) Applicant: Quanta Computer Inc., Taoyuan (TW)

(72) Inventors: Chun-I Chen, Taoyuan (TW); Chi-Hsuan Lee, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 0 days.

(21) Appl. No.: 15/970,130

(22) Filed: May 3, 2018

(65) Prior Publication Data
US 2019/0198975 A1    Jun. 27, 2019

(30) Foreign Application Priority Data
Dec. 25, 2017   (TW) .............................. 106145510 A (51) Int. Cl.
| | |
|---|---|
| *H01Q 1/38* | (2006.01) |
| *H01Q 1/24* | (2006.01) |
| *H01Q 21/28* | (2006.01) |
| *H04M 1/737* | (2006.01) |

(52) U.S. Cl.
CPC ............. *H01Q 1/243* (2013.01); *H01Q 21/28* (2013.01); *H01Q 1/38* (2013.01); *H04M 1/737* (2013.01)

(58) Field of Classification Search
CPC .......... H01Q 1/243; H01Q 21/28; H01Q 1/38; H04M 1/737
See application file for complete search history.

(56) References Cited

FOREIGN PATENT DOCUMENTS

| CN | 204167466 U | 2/2015 |
|---|---|---|
| CN | 104425893 A | 3/2015 |
| CN | 204289710 U | 4/2015 |

OTHER PUBLICATIONS

Chinese language office action dated Dec. 13, 2018, issued in application No. TW 106145510.

*Primary Examiner* — Graham P Smith
(74) *Attorney, Agent, or Firm* — McClure, Qualey & Rodack, LLP (57) ABSTRACT

A mobile device includes a ground element, a metal frame, a feeding connection element, a first radiation element, a second radiation element, a capacitive element, a first shorting element, a second shorting element, and a third shorting element. The first radiation element is coupled to the feeding connection element. The second radiation element includes a first portion and a second portion. The feeding connection element is coupled through the second radiation element to the metal frame. The capacitive element is coupled between the first portion and the second portion. The first shorting element, the second shorting element, and the third shorting element are coupled between the metal frame and the ground element. An antenna structure is formed by the ground element, the metal frame, the feeding connection element, the first radiation element, the second radiation element, the capacitive element, the first shorting element, and the second shorting element.

10 Claims, 7 Drawing Sheets

MOBILE DEVICE

CROSS REFERENCE TO RELATED APPLICATIONS

This Application claims priority of Taiwan Patent Application No. 106145510 filed on Dec. 25, 2017, the entirety of which is incorporated by reference herein.

BACKGROUND OF THE INVENTION

Field of the Invention

The disclosure generally relates to a mobile device, and specifically, to a mobile device and an antenna structure therein.

Description of the Related Art

With the progress being made in mobile communication technology, mobile devices such as portable computers, mobile phones, tablet computers, multimedia players, and other hybrid functional mobile devices have become common. To satisfy the demands of users, mobile devices can usually perform wireless communication functions. Some functions cover a large wireless communication area; for example, mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some functions cover a small wireless communication area; for example, mobile phones using Wi-Fi and Bluetooth systems and using frequency bands of 2.4 GHz, 5.2 GHz, and 5.8 GHz.

In order to improve the device's appearance, current designers often incorporate metal elements into mobile devices. However, these added metal elements tend to negatively affect the antennas used for wireless communication in mobile devices, thereby degrading the overall communication quality of mobile devices. As a result, there is a need to propose a novel mobile device with a novel antenna structure, so as to overcome the problems of the prior art.

BRIEF SUMMARY OF THE INVENTION

In a preferred embodiment, the disclosure is directed to a mobile device including a ground element, a metal frame, a feeding connection element, a first radiation element, a second radiation element, a capacitive element, a first shorting element, a second shorting element, and a third shorting element. The feeding connection element is coupled to a positive feeding point. The first radiation element is coupled to the feeding connection element. The second radiation element includes a first portion and a second portion. The feeding connection element is coupled through the second radiation element to a first connection point on the metal frame. The capacitive element is coupled between the first portion and the second portion. A second connection point on the metal frame is coupled through the first shorting element to a first grounding point on the ground element. A third connection point on the metal frame is coupled through the second shorting element to a second grounding point on the ground element. A fourth connection point on the metal frame is coupled through the third shorting element to a third grounding point on the ground element. An antenna structure is formed by the ground element, the metal frame, the feeding connection element, the first radiation element, the second radiation element, the capacitive element, the first shorting element, and the second shorting element. A positive electrode of a signal source is coupled to the positive feeding point, and a negative electrode of the signal source is coupled to a negative feeding point on the ground element, so as to excite the antenna structure.

In some embodiments, at least a portion of the metal frame substantially has an L-shape.

In some embodiments, the first radiation element substantially has a straight-line shape.

In some embodiments, the second radiation element substantially has an L-shape.

In some embodiments, the mobile device further includes a parasitic element. The parasitic element is coupled to a fourth grounding point on the ground element. The parasitic element is adjacent to the first radiation element.

In some embodiments, the parasitic element substantially has an L-shape.

In some embodiments, the antenna structure covers a first frequency band at 1575 MHz, a second frequency band from 2400 MHz to 2500 MHz, and a third frequency band from 5100 MHz to 5850 MHz.

In some embodiments, an inverted F-shaped resonant path is formed by the feeding connection element, the first radiation element, the second radiation element, the capacitive element, the metal frame, and the second shorting element. The inverted F-shaped resonant path is excited to generate the first frequency band.

In some embodiments, a first loop resonant path is formed by the feeding connection element, the second radiation element, the metal frame, the first shorting element, and the ground element. The first loop resonant path is excited to generate the second frequency band.

In some embodiments, a second loop resonant path is formed by the feeding connection element, the second radiation element, the metal frame, the second shorting element, and the ground element. The second loop resonant path is excited to generate the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
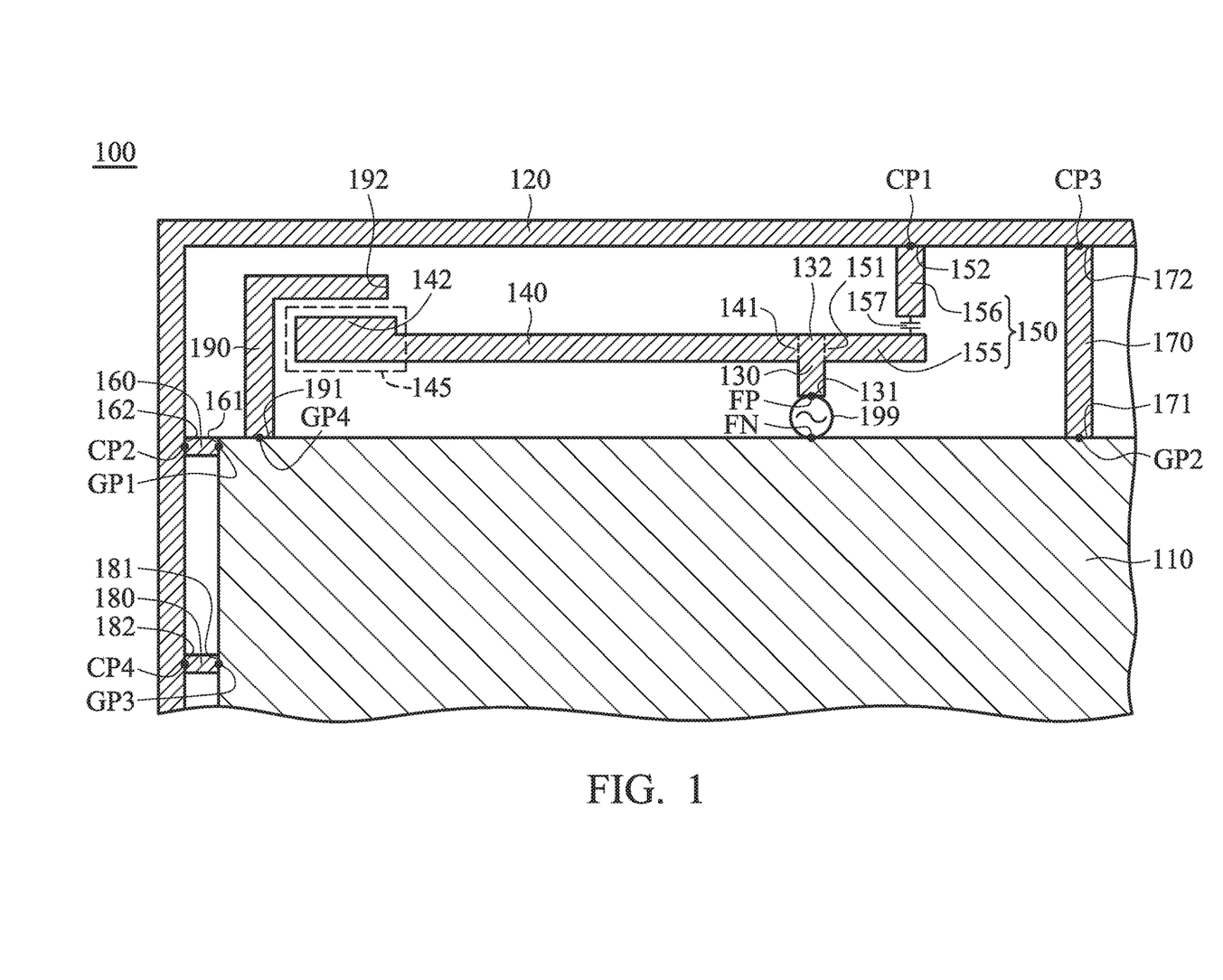
FIG. 1 is a partial top view of a mobile device according to an embodiment of the invention.

FIG. 1 is a partial top view of a mobile device 100 according to an embodiment of the invention. The mobile device 100 may be a smartphone, a tablet computer, or a notebook computer. In the embodiment of FIG. 1, the mobile device 100 at least includes a ground element 110, a metal frame 120, a feeding connection element 130, a first radiation element 140, a second radiation element 150, a capacitive element 157, a first shorting element 160, a second shorting element 170, and a third shorting element 180. It should be understood that the mobile device 100 may further include other components, such as a processor, a touch control panel, a speaker, a battery module, and a housing, although they are not displayed in FIG. 1.

The ground element 110, the feeding connection element 130, the first radiation element 140, the second radiation element 150, the first shorting element 160, the second shorting element 170, and the third shorting element 180 may be all made of metal materials, such as copper, silver, aluminum, iron, or their alloys. The ground plane 110 may be a metal plane having a relatively large size, and it can provide a ground voltage. In some embodiments, the mobile device 100 further includes a dielectric substrate, such as a PCB (Printed Circuit Board) or an FR4 (Flame Retardant 4) substrate. Any one or more of the ground element 110, the feeding connection element 130, the first radiation element 140, the second radiation element 150, the capacitive element 157, the first shorting element 160, the second shorting element 170, and the third shorting element 180 may be disposed on the dielectric substrate (not shown). In a preferred embodiment, an antenna structure is formed by the ground element 110, the metal frame 120, the feeding connection element 130, the first radiation element 140, the second radiation element 150, the capacitive element 157, the first shorting element 160, and the second shorting element 170.

The feeding connection element 130 may substantially have a straight-line shape. The feeding connection element 130 has a first end 131 and a second end 132. The first end 131 of the feeding connection element 130 is coupled to a positive feeding point FP. The mobile device 100 may further includes a signal source 199, which may be an RF (Radio Frequency) module. A positive electrode of the signal source 199 may be coupled to the positive feeding point FP, and a negative electrode of the signal source 199 may be coupled to a negative feeding point FN on the ground element 110, so as to excite the aforementioned antenna structure. In other embodiments, the positions of the positive feeding point FP and the position of the negative feeding point FN may be exchanged with each other, without affecting the performance of the invention.

The first radiation element 140 may substantially have a straight-line shape. The first radiation element 140 may be substantially perpendicular to the feeding connection element 130. The first radiation element 140 has a first end 141 and a second end 142. The first end 141 of the first radiation element 140 is coupled to the second end 132 of the feeding connection element 130. The second end 142 of the first radiation element 140 is an open end. In some embodiments, the first radiation element 140 further includes a rectangular widening portion 145, which is substantially positioned at the second end 142 of the first radiation element 140. The width of the rectangular widening portion 145 is greater than the width of the other portions of the first radiation element 140. The rectangular widening portion 145 is configured to fine-tune the low-frequency resonant points of the aforementioned antenna structure. It should be noted that the rectangular widening portion 145 is an optional element. In other embodiments, the rectangular widening portion 145 is removed (i.e., adjustments are made such that the first radiation element 140 has an equal-width structure).

The second radiation element 150 may substantially have an L-shape. The feeding connection element 130 is coupled through the second radiation element 150 to a first connection point CP1 on the metal frame 120. The second radiation element 150 has a first end 151 and a second end 152. The first end 151 of the second radiation element 150 is coupled to the second end 132 of the feeding connection element 130. The second end 152 of the second radiation element 150 is coupled to the first connection point CP1. Specifically, the second radiation element 150 includes a first portion 155 and a second portion 156. The first portion 155 may be substantially perpendicular to the feeding connection element 130. The second portion 156 may be substantially parallel to the feeding connection element 130. A T-shaped feeding connection structure may be formed by the feeding connection element 130, the first radiation element 140, and the first portion 155 of the second radiation element 150. The capacitive element 157 may be a general capacitor, a chip capacitor, or a variable capacitor. The capacitive element 157 is coupled in series between the first portion 155 and the second portion 156 of the second radiation element 150. The existence of the capacitive element 157 causes the aforementioned antenna structure to generate an additional resonant mode, thereby increasing the operation bandwidth of the antenna structure. The length of the second radiation element 150 (i.e., the total length of the first portion 155 and the second portion 156) may be shorter than the length of the first radiation element 140. For example, the length of the first radiation element 140 may be 2 to 4 times the length of the second radiation element 150, but it is not limited thereto. In alternative embodiments, if the capacitive element 157 is a variable capacitor, the operation frequency band of the antenna structure will be adjustable.

The first shorting element 160 may substantially have a straight-line shape. A second connection point CP2 on the metal frame 120 is coupled through the first shorting element 160 to a first grounding point GP1 on the ground element 110. The first shorting element 160 has a first end 161 and a second end 162. The first end 161 of the first shorting element 160 is coupled to the first grounding point GP1. The second end 162 of the first shorting element 160 is coupled to the second connection point CP2.

The second shorting element 170 may substantially have a straight-line shape. A third connection point CP3 on the metal frame 120 is coupled through the second shorting element 170 to a second grounding point GP2 on the ground element 110. The second shorting element 170 has a first end 171 and a second end 172. The first end 171 of the second shorting element 170 is coupled to the second grounding point GP2. The second end 172 of the second shorting element 170 is coupled to the third connection point CP3. The length of the second shorting element 170 may be greater than the length of the first shorting element 160. For example, the length of the second shorting element 170 may be 4 to 6 times the length of the first shorting element 160, but it is not limited thereto.

The third shorting element 180 may substantially have a straight-line shape. A fourth connection point CP4 on the metal frame 120 is coupled through the third shorting element 180 to a third grounding point GP3 on the ground element 110. The third shorting element 180 has a first end 181 and a second end 182. The first end 181 of the third shorting element 180 is coupled to the third grounding point GP3. The second end 182 of the third shorting element 180 is coupled to the fourth connection point CP4. The length of the third shorting element 180 may be shorter than the length of the second shorting element 170. For example, the length of the second shorting element 170 may be 4 to 6 times the length of the third shorting element 180, but it is not limited thereto.

In some embodiments, one or more of the first shorting element 160, the second shorting element 170, and the third shorting element 180 are replaced with one or more 3D (Three-Dimensional) connection elements. The 3D connection elements are not necessarily disposed on the dielectric substrate. For example, each 3D connection element may be a metal pogo pin, a metal spring, or a metal screw.

At least a portion of the metal frame 120 may substantially have an L-shape. The metal frame 120 may be used as an exterior decorative element of the mobile device 100. The so-called exterior decorative element is an element which covers the mobile device 100 and can be directly observed by eyes of a user. On the metal frame 120, the first connection point CP1 is substantially positioned between the second connection point CP2 and the third connection point CP3, and the second connection point CP2 is substantially positioned between the first connection point CP1 and the fourth connection point CP4. The length from the first connection point CP1 to the second connection point CP2 may be greater than the length from the first connection point CP1 to the third connection point CP3, and may also be greater than the length from the second connection point CP2 to the fourth connection point CP4. Generally, the metal frame 120 includes a portion positioned between the second connection point CP2 and the third connection point CP3, and the aforementioned portion is mainly excited to generate a radiation pattern of the antenna structure. In addition, on the ground element 110, the negative feeding point FN is substantially positioned between the first grounding point GP1 and the second grounding point GP2. The distance between the negative feeding point FN and the first grounding point GP1 may be greater than the distance between the negative feeding point FN and the second grounding point GP2.

In some embodiments, the mobile device 100 further includes a parasitic element 190, which may also be made of a metal material. The parasitic element 190 is adjacent to the first radiation element 140 (however, a separate gap may be formed between the parasitic element 190 and the first radiation element 140). The parasitic element 190 may substantially have an L-shape. It should be noted that the term "adjacent" or "close" over the disclosure means that the distance (spacing) between two corresponding elements is shorter than a predetermined distance (e.g., 3 mm or shorter); however, the term "adjacent" or "close" usually does not include the two corresponding elements which directly touch each other (i.e., the aforementioned distance/spacing therebetween cannot be reduced to 0). The parasitic element 190 has a first end 191 and a second end 192. The first end 191 of the parasitic element 190 is coupled to a fourth grounding point GP4 on the ground element 110. The second end 192 of the parasitic element 190 is an open end, which is adjacent to the second end 142 of the first radiation element 140 (or the rectangular widening portion 145). The fourth grounding point GP4 may be substantially positioned between the first grounding point GP1 and the negative feeding point FN (or the second grounding point GP2). The fourth grounding point GP4 may be very close to the first grounding point GP1. The parasitic element 190 is configured to increase the effective length of the low-frequency resonant path of the aforementioned antenna structure. It should be noted that the parasitic element 190 is an optional element. In other embodiments, adjustments are made such that the parasitic element 190 is removed.

Figure 2:
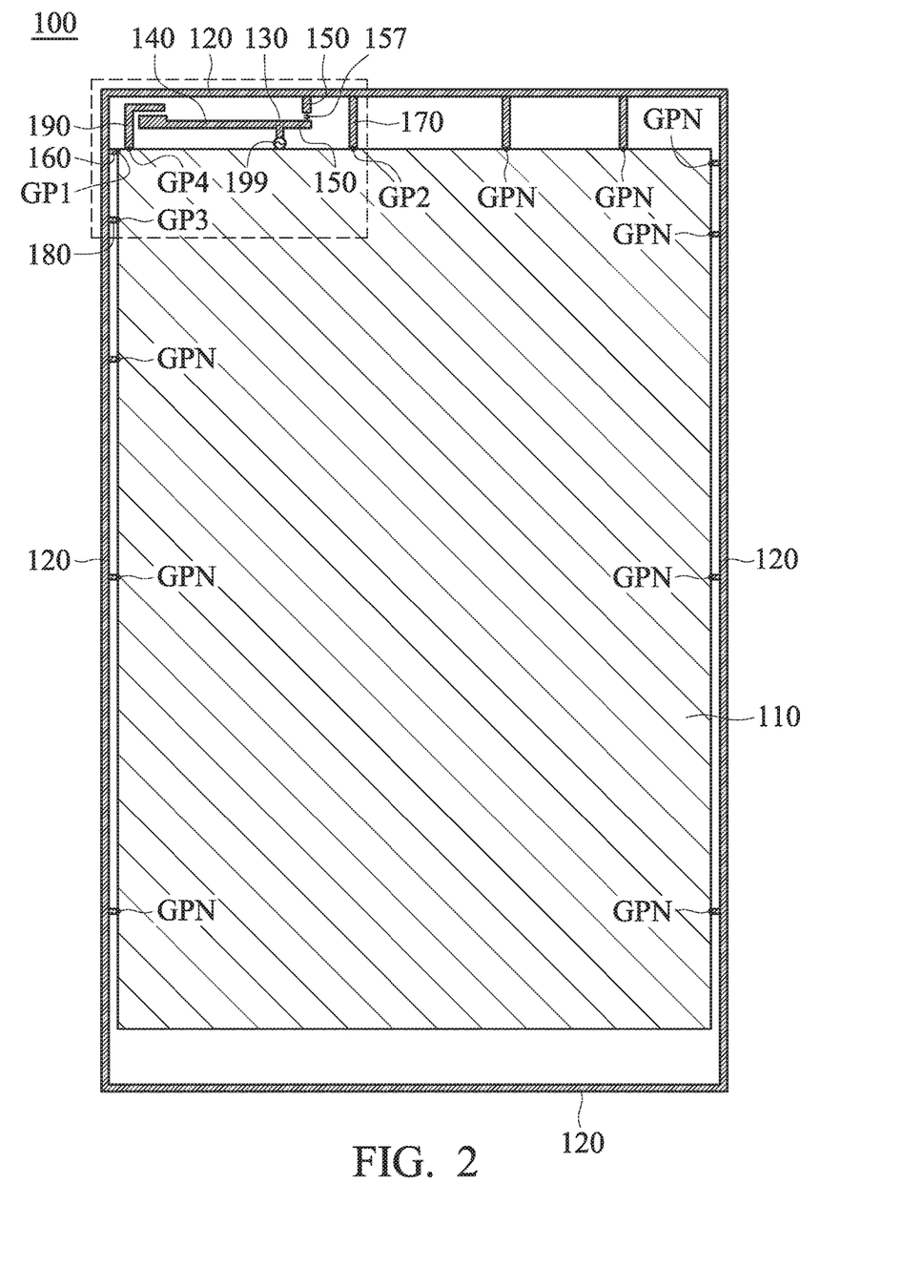
FIG. 2 is a complete top view of a mobile device according to an embodiment of the invention.

FIG. 2 is a complete top view of the mobile device 100 according to an embodiment of the invention. FIG. 1 is considered as a partial enlargement of FIG. 2 (indicated by a dashed box). In the embodiment of FIG. 2, the metal frame 120 is substantially a closed rectangular loop without any fracture, and the ground element 110 is substantially a rectangular metal plane. The ground element 110 is disposed inside the metal frame 120. Such a no-fracture metal frame 120 can effectively enhance the structural robustness of the mobile device 100. In other words, since there is no need to form any fracture points on the metal frame 120, the incorporation of the antenna structure does not degrade the robustness of the mobile device 100. Besides the first grounding point GP1, the second grounding point GP2, and the third grounding point GP3, the metal frame 120 may be further coupled through one or more shorting elements to one or more grounding points GPN on the ground element 110. The aforementioned grounding points GPN are arranged for suppressing undesired resonant modes. The positions and the number of the grounding points GPN and the corresponding shorting elements are adjustable according to different requirements. It should be noted that the third shorting element 180 and the third grounding point GP3 are configured to prevent the other portions of the metal frame 120 from generating resonant currents and interfering with the radiation performance of the antenna structure. If the third shorting element 180 and the third grounding point GP3 were removed, the operation frequency band of the antenna structure might be seriously shifted.

Figure 3A:
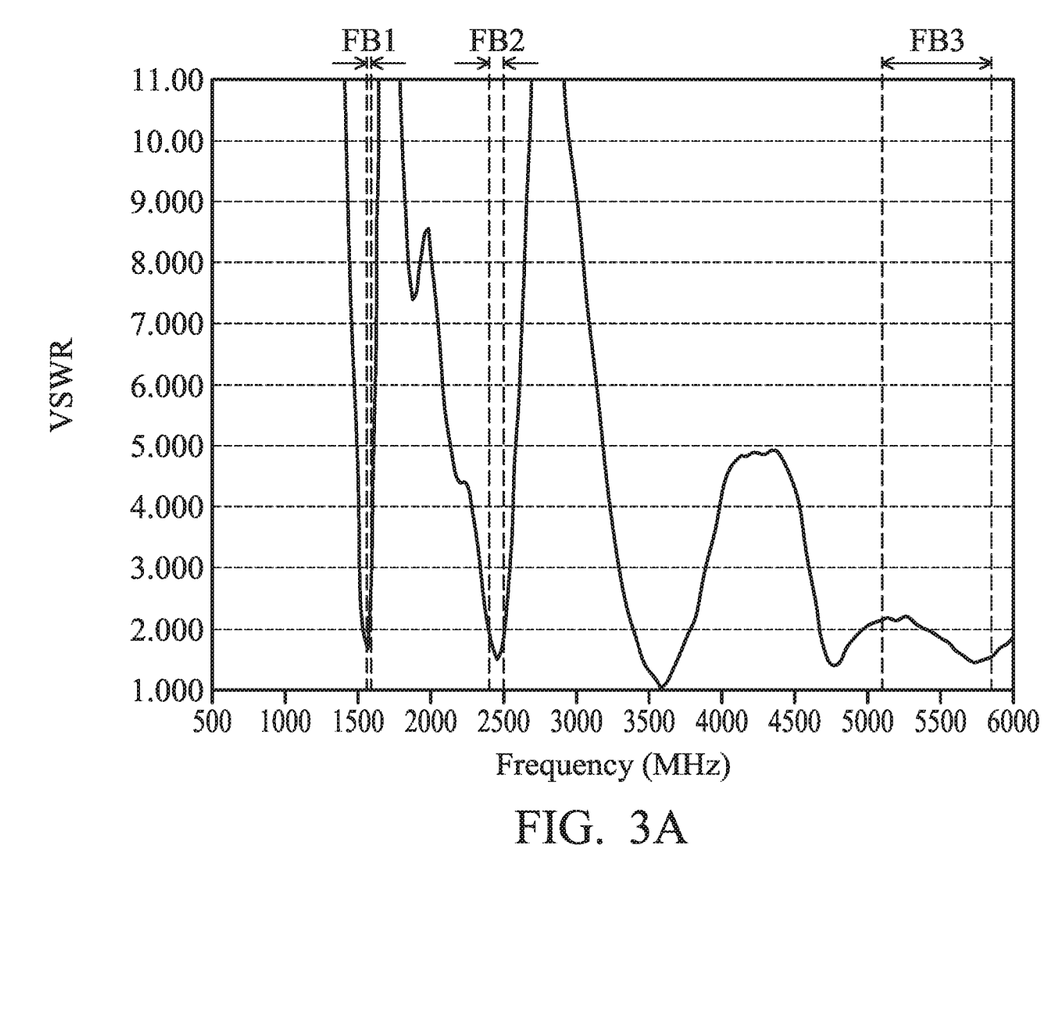
FIG. 3A is a diagram of VSWR (Voltage Standing Wave Ratio) of an antenna structure of a mobile device according to an embodiment of the invention.

FIG. 3A is a diagram of VSWR (Voltage Standing Wave Ratio) of the antenna structure of the mobile device 100 according to an embodiment of the invention. The horizontal axis represents the operation frequency (MHz), and the vertical axis represents the VSWR. According to the measurement of FIG. 3A, when receiving or transmitting wireless signals, the antenna structure of the mobile device 100 can cover a first frequency band FB1, a second frequency band FB2, and a third frequency band FB3. The first frequency band FB1 may be at or around 1575 MHz. The second frequency band FB2 may be from about 2400 MHz to about 2500 MHz. The third frequency band FB3 may be from about 5100 MHz to about 5850 MHz. Accordingly, the antenna structure of the mobile device 100 can support at least the wideband operations of GPS (Global Positioning System) and WLAN (Wireless Local Area Networks) 2.4 GHz/5 GHz.

Figure 3B:
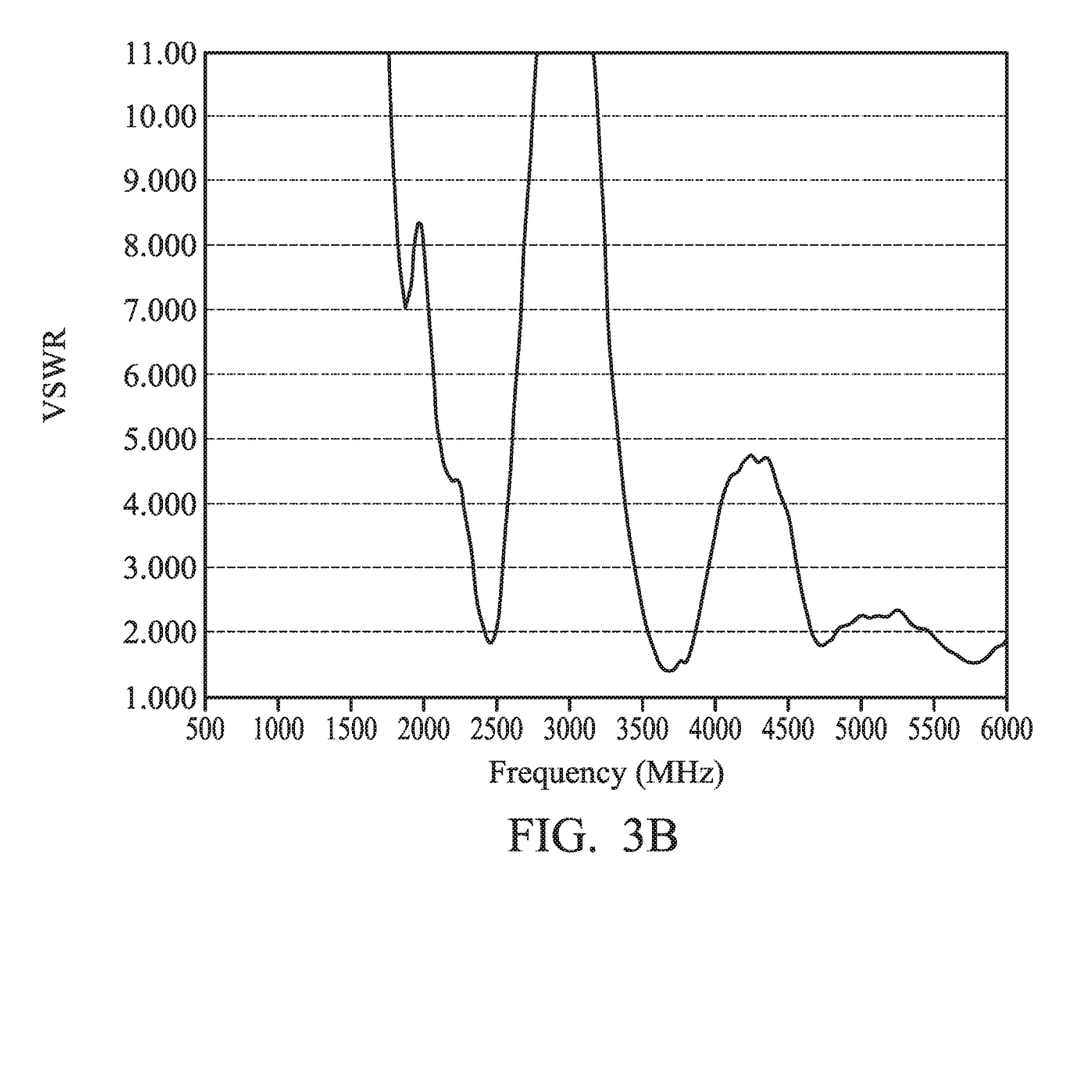
FIG. 3B is a diagram of VSWR of an antenna structure of a mobile device without a capacitive element.

FIG. 3B is a diagram of VSWR of the antenna structure of the mobile device 100 without the capacitive element 157. The horizontal axis represents the operation frequency (MHz), and the vertical axis represents the VSWR. By comparing FIG. 3A with FIG. 3B, if the capacitive element 157 were removed from the mobile device 100, the antenna structure could not cover the first frequency band FB1. Therefore, the existence of the capacitive element 157 causes the antenna structure to further generate a GPS resonant mode. In some embodiments, the capacitance of the capacitive element 157 is from 0.6 pF to 1 pF, and is preferably 0.8 pF. The above range of capacitance helps to maximize the operation bandwidth of the first frequency band FB1.

Specifically, the resonant mechanisms and operation principles of the antenna structure of the mobile device 100 will be illustrated in the following embodiments of FIG. 4A, FIG. 4B, and FIG. 4C.

Figure 4A:
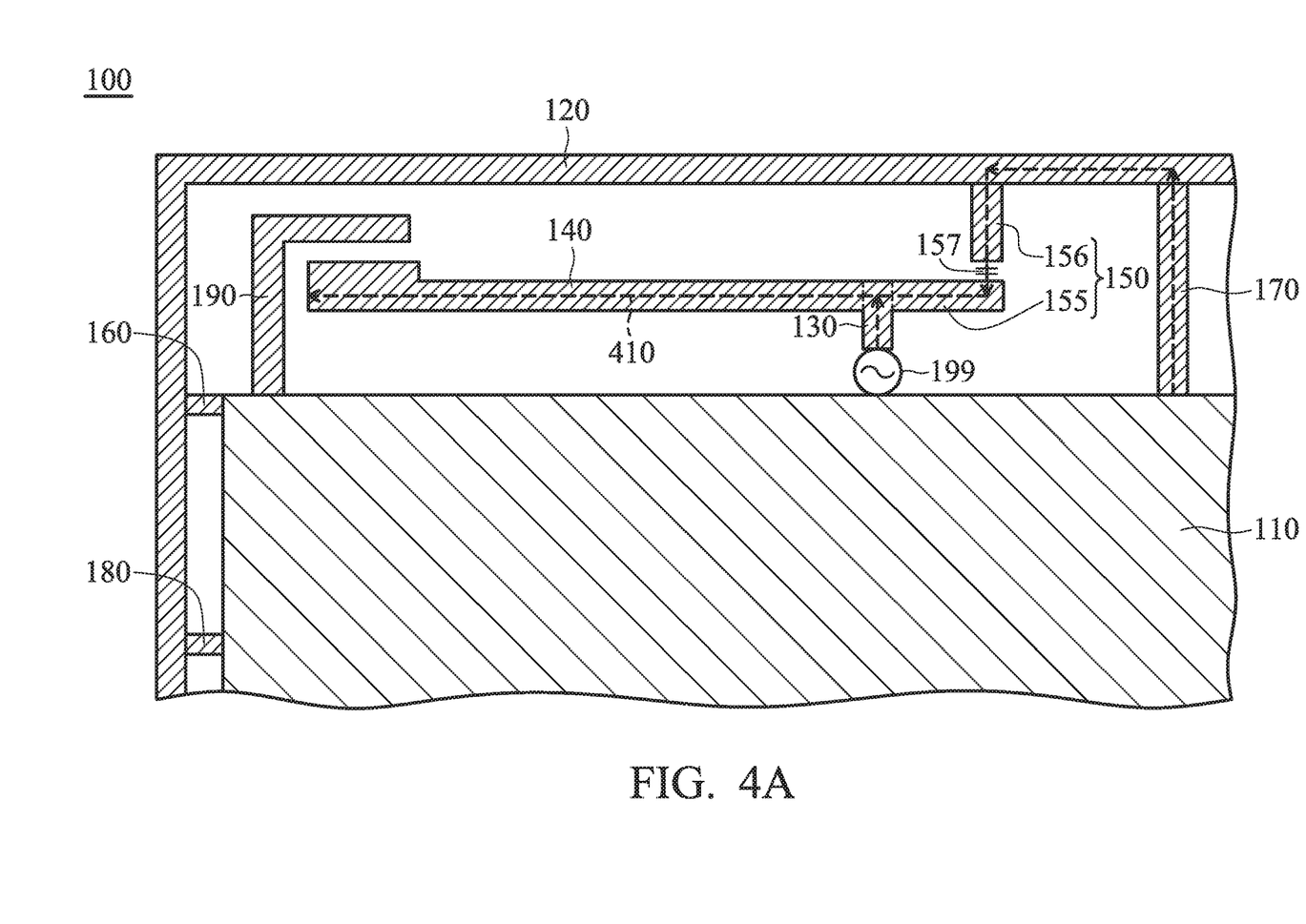
FIG. 4A is a diagram of resonant currents of an antenna structure of a mobile device when the antenna structure operates in a first frequency band, according to an embodiment of the invention.

FIG. 4A is a diagram of resonant currents of the antenna structure of the mobile device 100 when the antenna structure operates in the first frequency band FB1, according to an embodiment of the invention (the dashed arrows represent the possible flowing directions of the resonant currents). In the embodiment of FIG. 4A, an inverted F-shaped resonant path 410 is formed by the feeding connection element 130, the first radiation element 140, the second radiation element 150, the capacitive element 157, the metal frame 120 (especially for the portion of the metal frame 120 between the first connection point CP1 and the third connection point CP3), and the second shorting element 170. The inverted F-shaped resonant path 410 is excited to generate the first frequency band FB1.

Figure 4B:
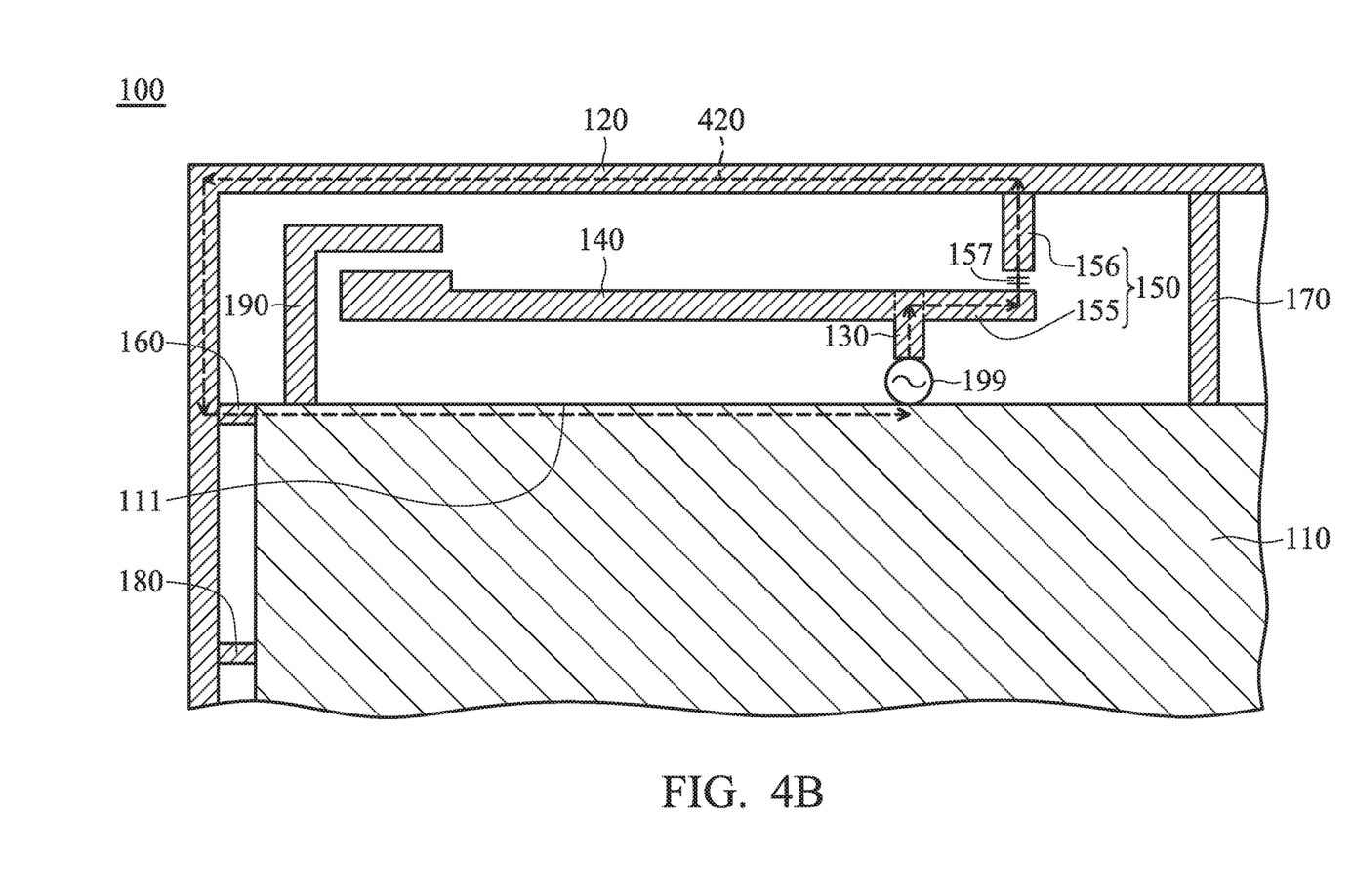
FIG. 4B is a diagram of resonant currents of an antenna structure of a mobile device when the antenna structure operates in a second frequency band, according to an embodiment of the invention.

FIG. 4B is a diagram of resonant currents of the antenna structure of the mobile device 100 when the antenna structure operates in the second frequency band FB2, according to an embodiment of the invention (the dashed arrows represent the possible flowing directions of the resonant currents). In the embodiment of FIG. 4B, a first loop resonant path 420 is formed by the feeding connection element 130, the second radiation element 150, the metal frame 120 (especially for the portion of the metal frame 120 between the first connection point CP1 and the second connection point CP2), the first shorting element 160, and a first edge 111 of the ground element 110 (the first edge 111 is positioned between the first grounding point GP1 and the negative feeding point FN). The first loop resonant path 420 is excited to generate the second frequency band FB2. It should be noted that the parasitic element 190 is considered as an extension portion of the first loop resonant path 420, which helps to further decrease the central frequency of the second frequency band FB2. Furthermore, the capacitive element 157 is considered as a short-circuited path in the second frequency band FB2.

Figure 4C:
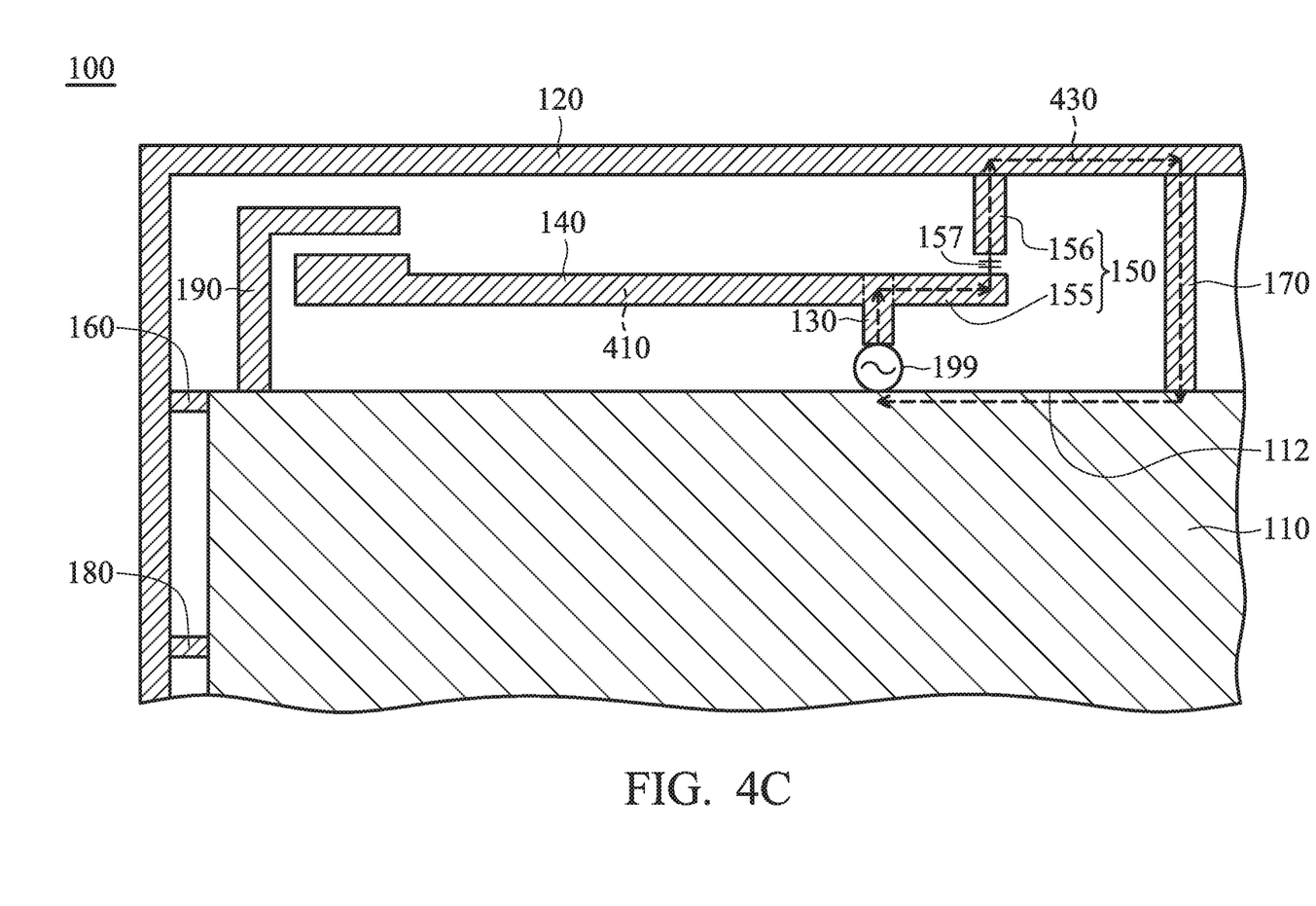
FIG. 4C is a diagram of resonant currents of an antenna structure of a mobile device when the antenna structure operates in a third frequency band, according to an embodiment of the invention.

FIG. 4C is a diagram of resonant currents of the antenna structure of the mobile device 100 when the antenna structure operates in the third frequency band FB3, according to an embodiment of the invention (the dashed arrows represent the possible flowing directions of the resonant currents). In the embodiment of FIG. 4C, a second loop resonant path 430 is formed by the feeding connection element 130, the second radiation element 150, the metal frame 120 (especially for the portion of the metal frame 120 between the first connection point CP1 and the third connection point CP3), the second shorting element 170, and a second edge 112 of the ground element 110 (the second edge 112 is positioned between the second grounding point GP2 and the negative feeding point FN). The second loop resonant path 430 is excited to generate the third frequency band FB3. Furthermore, the capacitive element 157 is considered as a short-circuited path in the third frequency band FB3.

In some embodiments, the element sizes of the mobile device 100 are as follows. The total length of the feeding connection element 130 and the first radiation element 140 (i.e., the total length from the first end 131 through the second end 132 and the first end 141 to the second end 142) may be substantially equal to 0.25 wavelength ($\lambda/4$) of the central frequency of the first frequency band FB1. The total length of the first loop resonant path 420 may be substantially equal to 0.5 wavelength ($\lambda/2$) of the central frequency of the second frequency band FB2. The total length of the second loop resonant path 430 may be substantially equal to 0.5 wavelength ($\lambda/2$) of the central frequency of the third frequency band FB3. The above ranges of element sizes are calculated and obtained according to many experiment results, and they help to optimize the operation frequency band and the impedance matching of the antenna structure of the mobile device 100.

The invention proposes a novel antenna structure. When the antenna structure is applied to a mobile device including a metal frame, the metal frame is considered as an extension portion of the antenna structure, and therefore such a design can effectively prevent the metal frame from negatively affecting the communication quality of the mobile device. Furthermore, the metal frame is used as an effective radiation element for reducing the total antenna size and increasing the antenna operation bandwidth. It should also be noted that the invention can improve the appearance of the mobile device without opening any antenna windows. In conclusion, the invention has the advantages of small device size, wide bandwidth, and beautiful device appearance, and it is suitable for application in a variety of mobile communication devices.

Note that the above element sizes, element shapes, and frequency ranges are not limitations of the invention. An antenna designer can adjust these settings or values according to different requirements. It should be understood that the mobile device and the antenna structure of the invention are not limited to the configurations of FIGS. 1-4. The invention may merely include any one or more features of any one or more embodiments of FIGS. 1-4. In other words, not all of the features shown in the figures should be implemented in the mobile device and the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A mobile device, comprising:
   a ground element;
   a metal frame;
   a feeding connection element, coupled to a positive feeding point;
   a first radiation element, coupled to the feeding connection element;
   a second radiation element, comprising a first portion and a second portion, wherein the feeding connection element is coupled through the second radiation element to a first connection point on the metal frame;
   a capacitive element, coupled between the first portion and the second portion;
   a first shorting element, wherein a second connection point on the metal frame is coupled through the first shorting element to a first grounding point on the ground element;
   a second shorting element, wherein a third connection point on the metal frame is coupled through the second shorting element to a second grounding point on the ground element; and
   a third shorting element, wherein a fourth connection point on the metal frame is coupled through the third shorting element to a third grounding point on the ground element;
   wherein an antenna structure is formed by the ground element, the metal frame, the feeding connection element, the first radiation element, the second radiation element, the capacitive element, the first shorting element, and the second shorting element;
   wherein a positive electrode of a signal source is coupled to the positive feeding point, and a negative electrode of the signal source is coupled to a negative feeding point on the ground element, so as to excite the antenna structure.

2. The mobile device as claimed in claim 1, wherein at least a portion of the metal frame substantially has an L-shape.

3. The mobile device as claimed in claim 1, wherein the first radiation element substantially has a straight-line shape.

4. The mobile device as claimed in claim 1, wherein the second radiation element substantially has an L-shape.

5. The mobile device as claimed in claim 1, further comprising:
   a parasitic element, coupled to a fourth grounding point on the ground element, wherein the parasitic element is adjacent to the first radiation element.

6. The mobile device as claimed in claim 5, wherein the parasitic element substantially has an L-shape.

7. The mobile device as claimed in claim 1, wherein the antenna structure covers a first frequency band at 1575 MHz, a second frequency band from 2400 MHz to 2500 MHz, and a third frequency band from 5100 MHz to 5850 MHz.

8. The mobile device as claimed in claim 7, wherein an inverted F-shaped resonant path is formed by the feeding connection element, the first radiation element, the second radiation element, the capacitive element, the metal frame, and the second shorting element, and wherein the inverted F-shaped resonant path is excited to generate the first frequency band.

9. The mobile device as claimed in claim 7, wherein a first loop resonant path is formed by the feeding connection element, the second radiation element, the metal frame, the first shorting element, and the ground element, and wherein the first loop resonant path is excited to generate the second frequency band.

10. The mobile device as claimed in claim 7, wherein a second loop resonant path is formed by the feeding connection element, the second radiation element, the metal frame, the second shorting element, and the ground element, and wherein the second loop resonant path is excited to generate the third frequency band.

* * * * *